United States Patent
Chowdhury et al.

(10) Patent No.: US 12,184,528 B2
(45) Date of Patent: Dec. 31, 2024

(54) METHODS AND APPARATUS FOR ADAPTIVE AND HOLISTIC NETWORK MEASUREMENTS

(71) Applicant: Ennetix Inc., Davis, CA (US)

(72) Inventors: Pulak Kumar Chowdhury, Davis, CA (US); Biswanath Mukherjee, Davis, CA (US)

(73) Assignee: Ennetix Inc., Davis, CA (US)

( * ) Notice: Subject to any disclaimer, the term of this patent is extended or adjusted under 35 U.S.C. 154(b) by 0 days.

(21) Appl. No.: 18/198,691

(22) Filed: May 17, 2023

(65) Prior Publication Data
US 2023/0388210 A1    Nov. 30, 2023

Related U.S. Application Data

(60) Provisional application No. 63/345,689, filed on May 25, 2022.

(51) Int. Cl.
| | |
|---|---|
| *H04L 43/10* | (2022.01) |
| *H04L 43/02* | (2022.01) |
| *H04L 43/04* | (2022.01) |
| *H04L 41/14* | (2022.01) |
| *H04L 43/045* | (2022.01) |
| *H04L 43/06* | (2022.01) |

(52) U.S. Cl.
CPC .............. *H04L 43/10* (2013.01); *H04L 43/02* (2013.01); *H04L 43/04* (2013.01)

(58) Field of Classification Search
CPC .......... H04L 43/10; H04L 43/02; H04L 43/04
See application file for complete search history.

(56) References Cited

U.S. PATENT DOCUMENTS

| | | | |
|---|---|---|---|
| 7,584,507 B1* | 9/2009 | Nucci | H04L 63/1416 726/22 |
| 9,455,890 B2 | 9/2016 | Lad et al. | |
| 9,503,384 B1 | 11/2016 | Oliveira et al. | |
| 9,729,414 B1 | 8/2017 | Oliveira et al. | |
| 9,800,478 B2 | 10/2017 | Lad et al. | |
| 10,841,187 B2 | 11/2020 | Dam et al. | |
| 11,032,124 B1 | 6/2021 | Haddow et al. | |
| 11,330,002 B2 | 5/2022 | Freedman et al. | |
| 2014/0280907 A1* | 9/2014 | Rothstein | H04L 67/51 709/224 |

(Continued)

FOREIGN PATENT DOCUMENTS

CN    111543027 A    9/2018

*Primary Examiner* — Kamal M Hossain
(74) *Attorney, Agent, or Firm* — Shun Yao; Yao Legal Services, Inc.

(57) ABSTRACT

One embodiment can provide a method and system for monitoring the performance of a network. During operation, the system can collect, from a network device, traffic data associated with a network; analyze the traffic data to discover dependencies among a plurality of applications and services accessed by client devices within the network; and identify, based on the discovered dependencies, a first server providing a first application and at least a second server providing a service that facilitates delivery of the first application. The system can further perform active measurement on the identified first server and at least the second server, thereby facilitating monitoring of performance of the first application.

17 Claims, 7 Drawing Sheets

(56) References Cited

U.S. PATENT DOCUMENTS

| | | | |
|---|---|---|---|
| 2016/0359705 A1* | 12/2016 | Parandehgheibi | H04L 43/062 |
| 2017/0155566 A1* | 6/2017 | Martinsen | H04L 43/10 |
| 2017/0208077 A1 | 7/2017 | Freedman et al. | |
| 2019/0312813 A1 | 10/2019 | Ellis et al. | |
| 2020/0242019 A1 | 7/2020 | Rodrigues et al. | |
| 2020/0304389 A1 | 9/2020 | Bauan et al. | |
| 2020/0328977 A1* | 10/2020 | Pfister | H04L 67/5681 |
| 2021/0111968 A1* | 4/2021 | Clarke | H04L 43/0817 |
| 2021/0136231 A1 | 5/2021 | Antunes et al. | |
| 2023/0012609 A1* | 1/2023 | Wang | H04L 43/10 |

* cited by examiner

METHODS AND APPARATUS FOR ADAPTIVE AND HOLISTIC NETWORK MEASUREMENTS

RELATED APPLICATIONS

This claims the benefit of U.S. Provisional Patent Application No. 63/345,689, entitled "METHODS AND APPARATUS FOR ADAPTIVE AND HOLISTIC NETWORK MEASUREMENTS," by inventors Pulak Kumar Chowdhury and Biswanath Mukherjee, filed 25 May 2022, the disclosure of which is incorporated herein by reference in its entirety for all purposes.

BACKGROUND

Field

This disclosure is generally related to network performance monitoring. Particularly, this invention relates to application-centric network performance monitoring.

Related Art

Enterprise applications are increasingly being moved from traditional, centralized, on-premises-only infrastructures to distributed and heterogeneous ones that incorporate resources within private and public clouds. At the same time, users want to have access to these applications from any location and at all times even though they may be served from remote data centers in the cloud. This creates a new challenge for end-to-end management of application performance since resources required for service delivery can be distributed across multiple data centers and locations, each of which may have different performance characteristics. Also, each resource could be under the administration of a different entity, so visibility of infrastructures and behaviors of applications are becoming extremely difficult.

In particular, in a dynamic and distributed environment, end-to-end network performance can have a significant impact on application performance, hence it should be continuously measured and correlated with application performance data (e.g., logs, endpoint metrics, etc.). A continuous measurement process can help information technology (IT) administrators in meeting the application and/or end-user performance requirement by enabling a feedback loop for automated and dynamic network/IT reconfigurations. However, gathering high-fidelity active measurements (while being aware of applications and their characteristics) in such a dynamic IT environment is a challenging task.

SUMMARY

One embodiment can provide a method and system for monitoring the performance of a network. During operation, the system can collect, from a network device, traffic data associated with a network; analyze the traffic data to discover dependencies among a plurality of applications accessed by client devices within the network; and identify, based on the discovered dependencies, a first server providing a first application and at least a second server providing a service that facilitates delivery of the first application. The system can further perform active measurement on the identified first server and at least the second server, thereby facilitating monitoring of performance of the first application.

In a variation on this embodiment, collecting the traffic data can include capturing packets belonging to different traffic flows passing through the network device, and analyzing the traffic data can include extracting flow information from headers of the captured packets and determining timing information associated with each flow.

In a further variation, analyzing the traffic data can include applying a machine-learning technique to determine temporal and frequency correlations among flows based on the flow information and the determined timing information associated with each flow.

In a variation on this embodiment, identifying the first and second servers can include, for a respective application, determining a number of servers providing the respective application to client devices within the network and identifying a set of most accessed servers from the determined servers.

In a variation on this embodiment, performing the active measurement on a respective server can include generating a plurality of probe sequences based on an address of the respective server and a communication protocol implemented by the respective server, injecting the probe sequences into the network, and receiving and analyzing responses to the probe sequences to obtain information associated with intermediate nodes on one or more paths to the respective server.

In a further variation, each probe sequence can include a plurality of packets with incrementing time-to-live (TTL) values, and packets within the probe sequence can have a similar packet signature such that the packets follow a same path to the respective server.

In a variation on this embodiment, the system can display the discovered dependencies on a user interface and display results of the active measurement on the user interface.

BRIEF DESCRIPTION OF THE FIGURES

In the figures, like reference numerals refer to the same figure elements.

DETAILED DESCRIPTION

Figure 1:
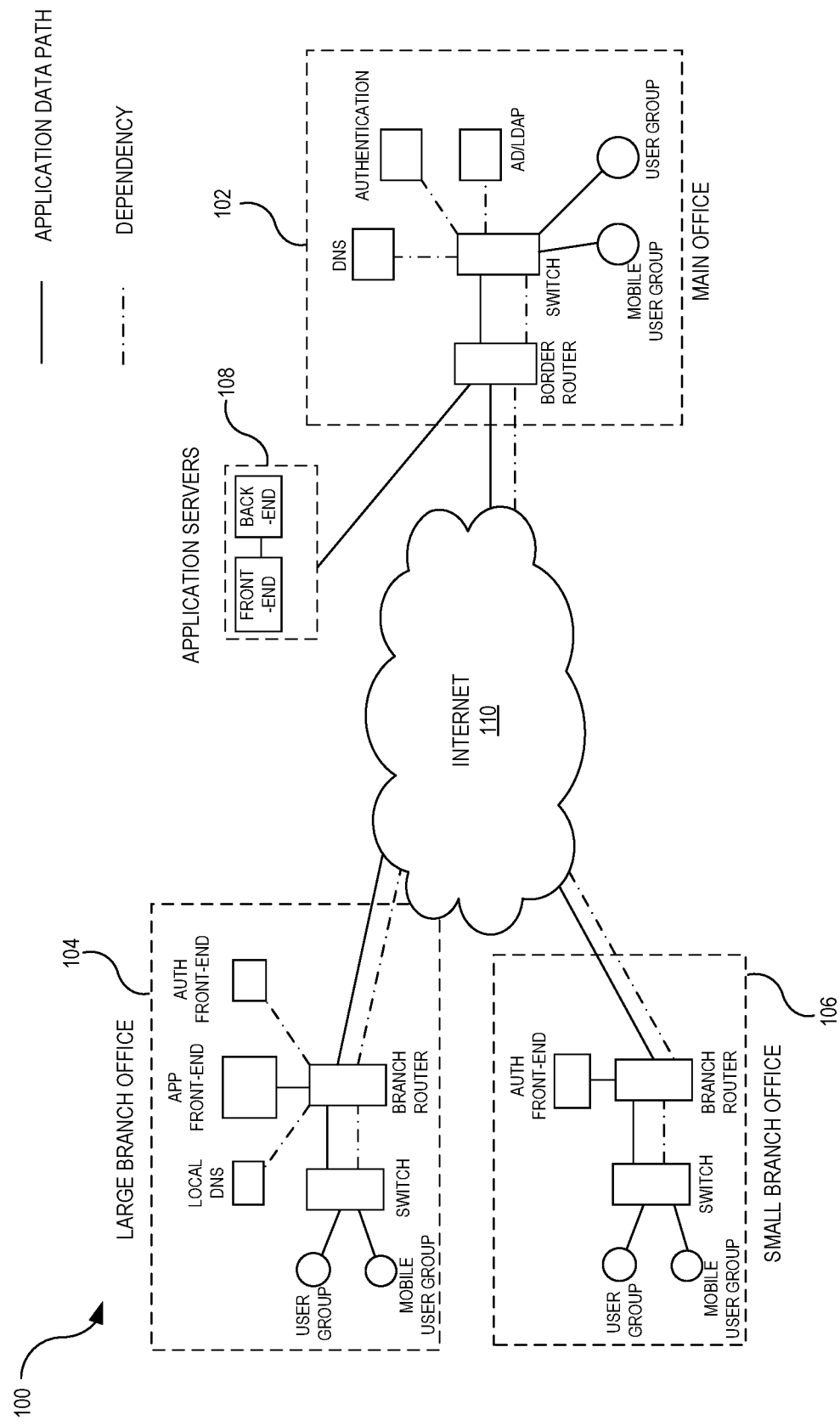
FIG. 1 illustrates an exemplary network environment demonstrating dependencies among an application and network services, according to one embodiment of the instant application.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein solve the technical problem of application-centric network performance monitoring. The proposed solution can provide a holistic network monitoring framework that can perform two types of measurement (i.e., the passive measurement and the active measurement) on the network in order to obtain performance data pertaining to applications of interest. More specifically, the passive measurement can include continuous traffic analysis, which can be used to automatically discover endpoints (e.g., application servers) associated with one or more critical applications (or applications of interests) and the dependencies among network functions and services. The active measurement can be performed based on the result of the passive measurement and can include adaptively sending probing packets to discovered endpoints and analyzing response packets to collect per-hop and end-to-end measurement results. The proposed holistic network monitoring framework can ensure that all packets in a probing sequence follow the same path to the remote end to avoid the measurement pitfalls arising from load-balancing routers in the networks. After collecting high-fidelity per-hop and end-to-end active measurement results, the proposed network monitoring framework can correlate the measurement result with other per-hop and/or endpoint measurements (e.g., system logs, metrics, etc.) that will be essential to manage the performance of distributed and dynamic applications. The proposed network monitoring framework can be applied in both the on-premises and the cloud-based network environments.

Discovery of Service Dependencies

Network administrators have traditionally used network measurement tools such as Ping and Traceroute to obtain network connectivity and per-hop characteristics. Such approaches can require manual identification of application endpoints, destinations, and other characteristics. In application-driven dynamic network settings, such traditional and rigid approaches will not scale to expose application-specific and protocol-specific hop-by-hop network characteristics. Applications and their characteristics and resource requirements continuously change in cloud infrastructures. Therefore, the network measurement methods should consider the types of protocols and applications transported on the network and adapt continuously (by following application protocols and characteristics) to detect causal dependencies of the applications on other network functions and services.

Network-based applications and services typically do not operate independently. For example, when a client accesses a web application (e.g., Google search), it usually needs to contact a Domain Name System (DNS) server to resolve the Internet Protocol (IP) address of the web server (e.g., Google.com). In an additional example, an enterprise application may also require the webserver to contact an authentication server to verify whether the client has the required privilege. Depending on the type of application, the web server may also rely on a database server to provide the data required by the application. The dependencies among the network-based services and applications can be time-varying and can often depend on user locations.

FIG. 1 illustrates an exemplary network environment demonstrating dependencies among an application and network services, according to one embodiment of the instant application. In FIG. 1, an enterprise network 100 can include a main-office network 102, a large-branch-office network 104, and a small-branch-office network 106. Networks 102, 104, and 106 can be coupled to each other via Internet 110.

FIG. 1 also shows application servers 108 for providing certain applications or services to users in main-office network 102, large-branch-office network 104, or small-branch-office network 106. The application servers can reside in a public cloud or private data centers. Application servers 108 can include both the front-end and back-end servers of the applications.

In the example shown in FIG. 1, main-office network 102 can include a number of switches and routers (e.g., a border router) and a number of servers for providing network-based services, such as a DNS server, an authentication server, a directory server (e.g., a Lightweight Directory Access Protocol (LDAP) server), etc. Users (either from the mobile user group or the local user group) in the main office can access services provided by application servers 108 via switches and routers in main-office network 102. To facilitate the local users' access to application servers 108, the network switch to which the local users' devices are connected can query the DNS server in main-office network 102. Note that mobile users may rely on DNS servers that are closer to them for address resolution. In addition to the DNS server, the switch may also need to query the authentication server and the directory server.

Large-branch-office network 104 can include a number of switches and routers (e.g., a branch router), a local DNS server, and a front-end server of the applications provided by application servers 108. Unlike main-office network 102, large-branch-office network 104 in this example does not include a DNS server and only includes the front-end server of the authentication application. When local users in the large branch office access the applications (e.g., via the front-end servers), the address resolution may be performed at the local DNS server in large-branch-office network 104. However, authentication of the users may still rely on the authentication server in the main office.

Small-branch-office network 106 is simpler than large-branch-office network 104 and may only include, in addition to switches and routers, a front-end server of the authentication application. Therefore, the address resolution now relies on the DNS server in the main office. Similarly, user authentication also relies on the authentication server in the main office. In FIG. 1, the solid lines connecting the network devices indicate the application data path, and the dashed lines indicate the dependencies.

Knowledge of the dependencies among the network services can be essential. When an application fails at the end host (e.g., a particular user's device), it is important to know which network services are involved in this application and how they depend on each other in order to isolate and identify faults. For example, when a user in the main office cannot access an application provided by application servers 108, the failure may be caused by failures on application servers 108, failures on the DNS server in the main office, or failures on the authentication server in the main office. In another example, a failure at the user device in the large branch office may be caused by failures on application servers 108, failures on the local DNS server in the large branch office, or failures on the authentication server in the main office. In yet another example, a failure in the small branch office may be caused by failures on application servers 108, failures on the DNS server in the main office, or failures on the authentication server in the main office. In addition, when the network is under malicious attacks, the knowledge of network services required for mission-critical applications, the dependencies among them, and the availability of redundant services can provide useful information for planning and prioritizing defense actions against the attacks.

A number of approaches can be used to discover the dependencies among the network services and functions. One straightforward approach is to have the IT administrator manually analyze the service configuration files. However, this can be cumbersome and time-consuming. In some embodiments, the dependencies among the network services can be automatically discovered by an application-centric network monitoring framework. More specifically, the application-centric network monitoring framework can include a customized traffic analyzer that can passively capture the network traffic (e.g., by communicating with a network device such as an end host, a central switch, or an aggregating router). In the example shown in FIG. 1, the customized traffic analyzer can communicate with the border router in the main office and use a port-mirroring technique to obtain a copy of all traffic passing through the border router. The customized traffic analyzer can then use information extracted from the packet headers to discover the dependencies among the network services accessed by users in the organization. In some embodiments, the customized traffic analyzer can examine the headers of all packets. In some other embodiments, the customer can define a number of applications of interest (e.g., applications that are mission-critical to the operation of the organization), and the customized traffic analyzer can apply a filter to examine the headers of packets associated with those applications.

In some embodiments, the customized traffic analyzer can implement a machine-learning technique to automatically discover the dependencies based on flow information included in the packet headers, including but not limited to source and destination addresses, source and destination port numbers, protocols, packet sequence numbers, time-to-live (TTL) values, packet lengths, etc. In addition to the flow information, timing information (the timestamps applied to the packets at the time of capture) associated with each flow can also be used for dependency discovery. In one embodiment, flow information extracted from the header of a packet plus the timing information associated with the packet can form a feature vector. An unsupervised learning technique (e.g., a clustering technique like k-means) can be applied to feature vectors of the captured packets in order to discover the dependency among the network services. In one embodiment, a large-scale analysis in both the time dimension (e.g., the traffic is collected over a large time duration) and the frequency dimension (e.g., the traffic is from a large number of user IP addresses) can be performed in order to discover the service-dependency patterns. For an application of interest, the dependency pattern can include the addresses and characteristics of endpoints (e.g., servers) involved in the application traffic.

For example, the machine-learning unit of the customized traffic analyzer can determine the causal dependency between two network services based on the temporal and frequency correlations between packets belonging to the two services. Using FIG. 1 as an example, the machine-learning unit can cluster packets passing through the border router in the main office based on the timing information associated with the packets and determine that traffic to application servers 108 from users in the main office often follows (e.g., within a predetermined time interval) traffic to the DNS server in the main office. The predetermined time interval can be a few milliseconds or less. Accordingly, it can be determined that, for users in the main office, the applications provided by application servers 108 depend on the services provided by the DNS server in the main office. In addition, the machine-learning unit can determine that traffic to application servers 108 from users in the large branch office often follows traffic (e.g., within a predetermined time interval) to the local DNS server in the large branch office. The temporal correlation between the traffic flows can indicate that, for users in the large branch office, the applications provided by application servers 108 depend on the services provided by the local DNS server in the large branch office. Performing the long-range analysis of the traffic data to discover the temporal and frequency correlations between flows in the sub-millisecond level can be referred to as Temporal Investigation.

Once the dependencies are discovered, the framework can determine the addresses (e.g., the IP addresses) of the endpoints involved in providing a particular application to a particular user or a particular group of users and the characteristics of each endpoint (e.g., whether it is a DNS server, an authentication server, a directory server, a web server, a database, etc.). In the cloud-based environment, dependencies can vary with users' locations. In other words, for the same application, traffic from users at different locations may experience different dependencies. For example, users in different states accessing the Google search application may access different Google servers and may also rely on different DNS servers for address resolution.

Figure 2:
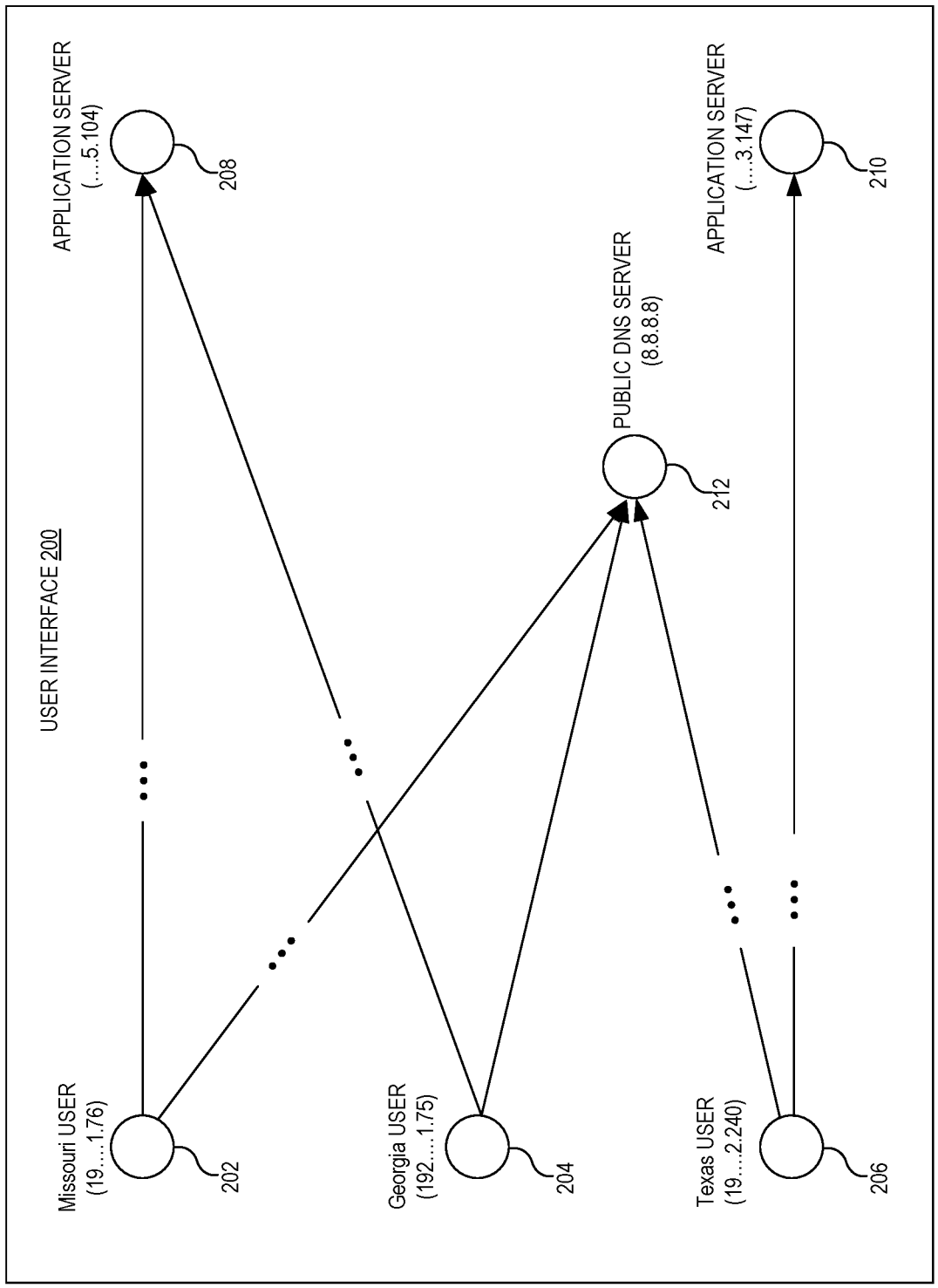
FIG. 2 illustrates an example of the dependencies displayed in a user interface, according to one embodiment of the instant application.

The discovered dependencies can be presented to the IT administrator in a user interface. FIG. 2 illustrates an example of the dependencies displayed in a user interface, according to one embodiment of the instant application. In FIG. 2, a user interface 200 displays a number of dependencies associated with a search application. More specifically, user interface 200 displays a number of end hosts at different geographic locations, including an end host 202 in Missouri, an end host 204 in Georgia, and an end host 206 in Texas. As can be seen in FIG. 2, for the same search application, end host 202 in Missouri and end host 204 in Georgia are accessing an application server 208 having a particular IP address, whereas end host 206 in Texas is accessing another application server 210 having a different IP address. In addition, access to the search application from all end hosts depends on the DNS service provided by a public DNS server 212 with an IP address 8.8.8.8. In other words, for users in Missouri and Georgia, endpoints involved in the search application include application server 208 and DNS server 212; for users in Texas, endpoints involved in the search application include application server 210 and DNS server 212. Note that the displayed dependencies show only the endpoints, including their addresses and characteristics. Discovery of the intermediate nodes along the paths may require further probing, which will be discussed later.

Note that the temporal correlation among flows belonging to different network services may be affected by user behavior and user settings. For example, once a user device obtains the address-resolution result from the DNS server for a particular application server, the user device may keep the result for a predetermined duration such that a subsequent access to the application server may not require a DNS query. In addition, for the same application, different user settings may result in different dependencies. In some embodiments, the application-centric network monitoring framework can also obtain information associated with the behaviors of a large number of users from the passively collected traffic data and derive dependencies from the user behavior information. For example, it can determine the time, frequency, and/or duration of each user accessing particular applications. On the organization level, for a particular application, it can determine the number of users accessing other related applications. The user behavior information can also be presented to the IT administrator in a user interface.

Figure 3:
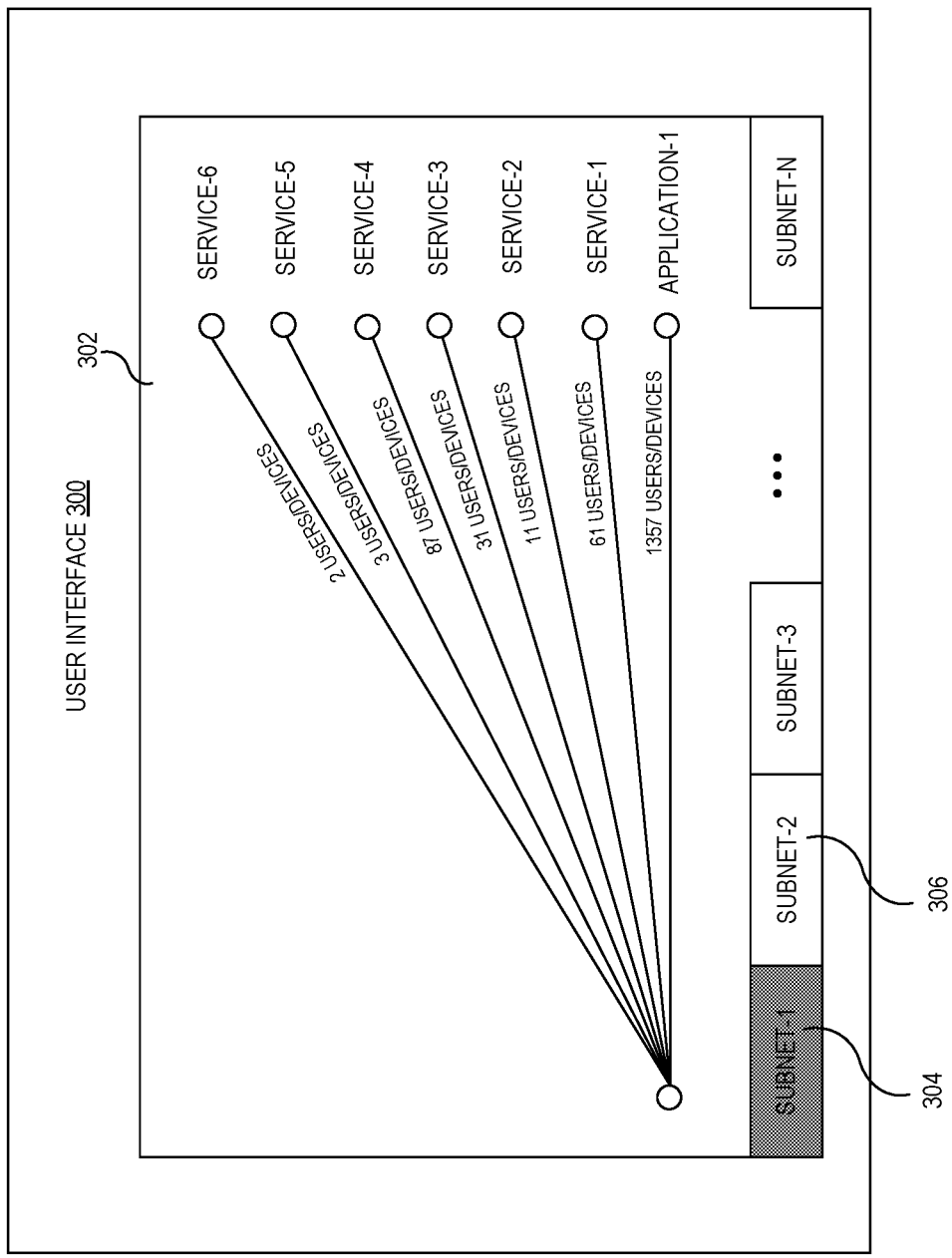
FIG. 3 illustrates an example of users' behaviors and corresponding dependencies of an application and services displayed in a user interface, according to one embodiment of the instant application.

FIG. 3 illustrates an example of users' behaviors and corresponding dependencies of an application and services displayed in a user interface, according to one embodiment. In FIG. 3, a user interface 300 can include a display area 302 and a number of tabs (e.g., tabs 304 and 306). Each tab corresponds to a portion of the monitored network, such as a subnet. When the user selects a tab, display area 302 can display a number of applications that have been accessed by users in the corresponding subnet.

In the example shown in FIG. 3, tab 304 is selected, which corresponds to subnet-1. FIG. 3 also shows one application (e.g., Application-1) and six interdependent services (e.g., Sevice-1 through Service-6) that have been accessed by users in subnet-1. Note that the application can be launched by a user on a client device, whereas the services are typically not launched by the user. Instead, user access to the services can be triggered by the launched application. The application cannot function correctly without one or more of those services. More particularly, FIG. 3 shows that among the 1357 users accessing/launching Application-1, 11 users are also accessing Service-2, and 31 users are accessing Service-3. In one example, Application-1 can be an email application (e.g., Outlook), Service-2 can be an authentication service (e.g., Kerberos, Duo Security, etc.), and Service-3 can be a DNS service. In order for the email application to deliver emails to the user, the email application needs the authentication service to authenticate the user and the DNS server to perform name resolution on the destination address. Additional examples of network services that an email application may depend on can also include but are not limited to directory services (e.g., Active Directory, Lightweight Directory Access Protocol (LDAP), etc.), mail transfer services (e.g., Simple Mail Transfer Protocol (SMTP) services).

A cloud-based application can use many geographically dispersed servers to provide services. For each application, the framework can also rank the accessed servers based on the number of users accessing them. In one embodiment, the framework can be configured to monitor a predetermined number of top-ranked (or most accessed) servers. The number of monitored servers can be user configurable. For example, the IT administrator may configure the framework to monitor the top-10 application servers for each application. The number of monitored servers can also depend on the type of service provided by the servers. For example, there may be fewer DNS servers than other types of servers, and the framework can be configured to monitor only the top three or four DNS servers.

Discovery of Paths

The passive measurement of the network can provide information about the endpoints of the application flows and dependencies among network services. However, it cannot provide information about intermediate nodes between the endpoints. On the other hand, active measurement of the network can provide essential information about those intermediate nodes. In some embodiments of the instant application, once the dependencies among services associated with an application are discovered, the framework can adaptively inject probe packets that mimic application packets sent from user devices into the network and monitor the response packets to obtain information about the paths between endpoints. Such probe packets are synthesized packets, which can be referred to as application-centric path-discovery packets.

Unlike the conventional network monitoring tool Traceroute, which uses Internet Control Message Protocol (ICMP) packets as probe packets, the framework can create probe streams specific to the monitored applications. In some embodiments, the per-hop probe packet streams can be specially crafted and adapted to stimulate specific responses from the intermediate network devices. For example, to discover paths between an end host and a DNS server, the framework can create a sequence of DNS queries and send these synthesized DNS queries to the DNS server.

Using FIG. 2 as an example, for end host 202, the remote endpoints involved in the search application can include application server 208 and public DNS server 212. To determine the path(s) between end host 202 and application server 208, the framework can generate a sequence of probe packets with the IP address of application server 208 as the destination IP address. Moreover, the generated probe packets can conform to the protocol implemented at application server 208. If application server 208 implements the Transmission Control Protocol (TCP), the generated probe packets can include TCP packets; if application server 208 implements the User Datagram Protocol (UDP), the generated probe packets can include UDP packets. To determine the path(s) between end host 202 and DNS server 212, the framework can generate a sequence of probe packets with the IP address of DNS server 212 as the destination IP address. As discussed previously, the probe packets sent to DNS server 212 can include DNS queries.

The sequence of probe packets can have incrementing TTL values such that all intermediate nodes on the path can be discovered. The characteristics of each hop (e.g., delay, jitter, packet-loss rate, etc.) can be measured based on the response packets from that hop. In some embodiments of the instant application, the framework can use packet signatures to ensure that all packets in a probing sequence follow the same path to the remote end. This is designed to avoid the measurement pitfalls caused by load-balancing routers in the networks. To discover multiple paths between a pair of endpoints, the framework can generate multiple probe sequences with different signatures. The discovered paths can also be presented to the IT administrator in a user interface.

Figure 4:
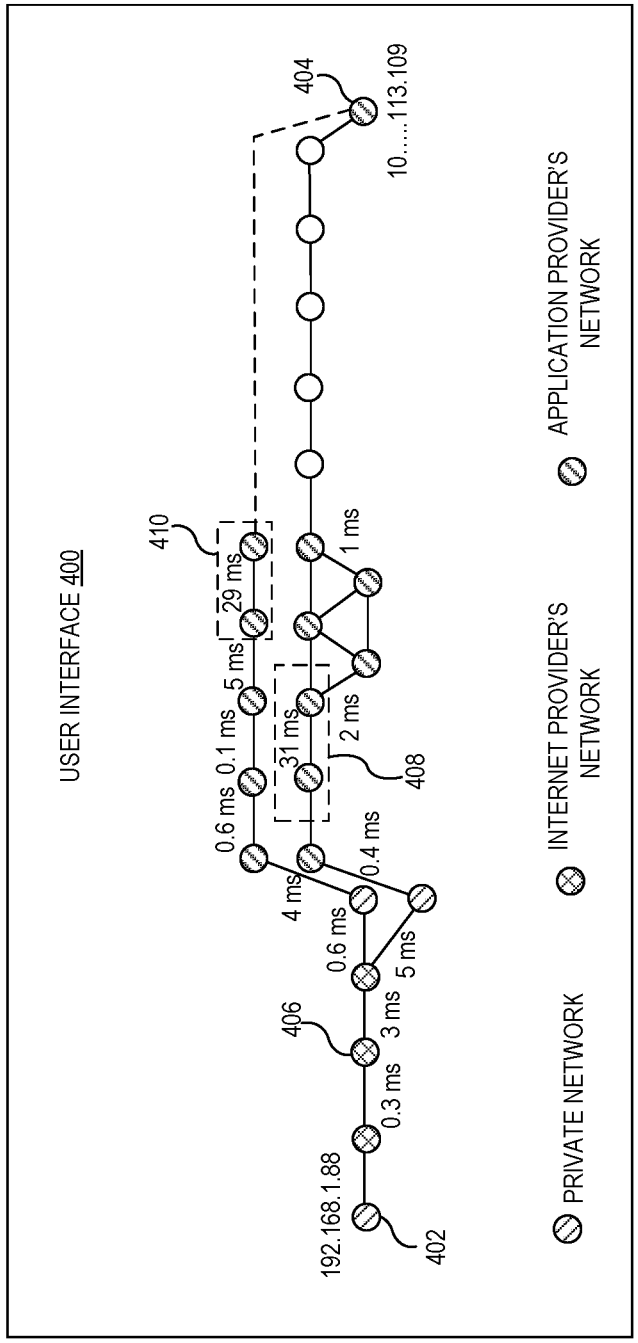
FIG. 4 illustrates an exemplary user interface displaying network paths to a server, according to one embodiment of the instant application.

FIG. 4 illustrates an exemplary user interface, according to one embodiment of the present application. In FIG. 4, user interface 400 displays the discovered multiple paths between a local end host 402 and a remote application server 404. In addition to the intermediate nodes, the delay at each hop can also be displayed when such data is available. Other performance data (e.g., jitter, packet-loss rate, etc.) at each hop may also be displayed, although they are not shown in FIG. 4.

In FIG. 4, intermediate nodes shown with different hatching patterns belong to different autonomous systems, such as the private network, the network of the service provider, and the network of the application provider. For example, local end host 402 belongs to the private network, intermediate node 406 belongs to the internet provider's network, and remote application server 404 belongs to the application provider's network. During the path discovery, the framework can determine the autonomous system to which an intermediate node belongs based on Border Gateway Protocol (BGP) data, such as responses from a BGP router.

The path information discovered via the active measurement can provide essential information to the IT administrator for fault diagnosis and mitigation. In FIG. 4, significant delays are shown in certain hops on the paths (e.g., hops 408 and 410) between local end host 402 and remote application server 404. The IT administrator may correlate such delays with the performance degradation of the application provided by remote application server 404. Because those hops belong to the application provider's network, the IT administrator of the private network can contact the application provider and request the application provider to reduce delays in those hops.

Figure 5:
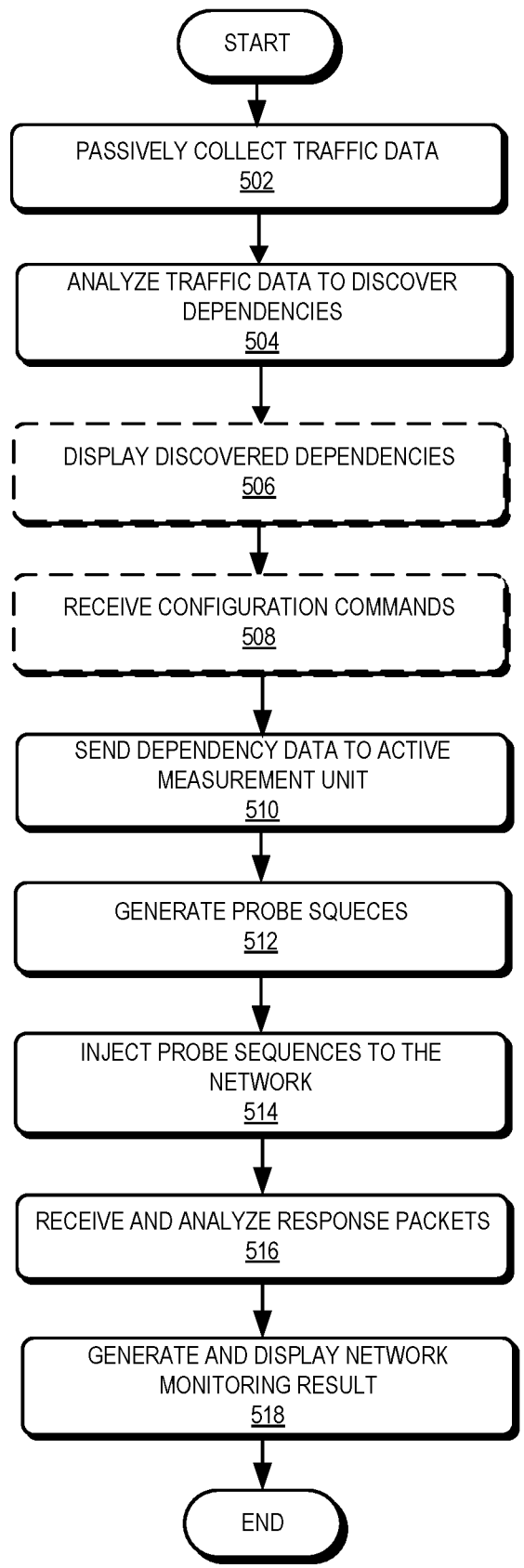
FIG. 5 presents a flowchart illustrating an exemplary network monitoring process, according to one embodiment of the instant application.

FIG. 5 presents a flowchart illustrating an exemplary network monitoring process, according to one embodiment of the present application. During operation, the passive measurement unit of the framework can passively collect network traffic data (operation 502). In some embodiments, a port-mirroring technique can be used such that traffic arriving at an end host or aggregating point in the monitored network can be captured. An example of the aggregating point can be an edge or gateway router.

The passive measurement unit can analyze the traffic data to discover dependencies among services and network functions (operation 504). In some embodiments, information extracted from packet headers (e.g., source/destination addresses and port numbers, protocols, packet sequence numbers, etc.) and timing information (e.g., timestamps) associated with each packet can be used as inputs of a machine-learning model (e.g., a classifier), which can use an unsupervised machine-learning technique to discover the dependencies. In further embodiments, Temporal Investigation can be performed on the traffic flows to discover the causal dependencies among different network services or functions. Traffic flows originating from the same end host within a predetermined small interval (e.g., milliseconds or less) may indicate dependency among the destination servers. By analyzing traffic data associated with a large number of users and collected over a large time window, the passive measurement unit can accurately discover the dependencies among applications accessed by the users. Because the application traffic is dynamic, the dependency-discovery operations should be performed periodically. In some embodiments, the time interval between consecutive dependency-discovery operations can be between 30 minutes and a few hours. In one example, the passive measurement unit can determine the dependencies associated with a particular application for a particular user or user group. In other words, it can identify a number of endpoints (e.g., actual servers) involved in the user's or user group's access to the particular application. The passive measurement unit can also determine the characteristics (e.g., the server type) of the servers.

The discovered dependencies can be optionally displayed to the IT administrator on a user interface (operation 506). The framework can also optionally receive, via the user interface, configuration commands from the IT administrator (operation 508). In one embodiment, the configuration commands can specify the scale of the active measurement, such as the number of servers to be actively probed. The passive measurement unit can send the discovered dependency data to the active measurement unit of the framework (operation 510). The dependency data can include applications accessed by users, addresses and characteristics of endpoints (e.g., servers) involved in each application, and the discovered interdependent relationships among the applications and services. Because a particular application may be provided by many different servers, to reduce the burden on the active measurement unit, for each application, the passive measurement unit may include a predetermined number (e.g., between five and ten) of top servers in the dependency data reported to the active measurement unit. Using Internet search as an example, the dependency data associated with the search application can include an application server providing the search application and at least one DNS server providing the address-resolution application that facilitates the delivery of the search application.

For each endpoint or server, the active measurement unit can generate a number of sequences of probe or path-discovery packets (operation 512). Each probe or path-discovery packet can be similar to an actual application packet sent by the user. More specifically, the source address and port number of the probe packet can be those of the end host, and the destination address and port number can be those of the application server. The probe packets can be generated based on the same communication protocol (e.g., TCP or UDP) as that of the application packets. In one embodiment, the frame format (including the header fields and the payload) can be similar to that of the application packets. Each probe sequence can include packets with incrementing TTL values in order to obtain the per-hop path information. Packets within the same sequence should have similar packet signatures such that they can follow the same path, and packets in different sequences should have different packet signatures in order to discover multiple paths. In some embodiments, the number of generated sequences can be user configurable, and the framework can generate multiple probe sequences simultaneously. In alternative embodiments, the system can generate the sequences one by one.

Subsequently, the active measurement unit can inject the probe sequences into the network (operation 514). Depending on the type of server being probed (e.g., a DNS server or a particular type of application server), the active measurement unit may adaptively adjust the probe method, such as the number of sequences to be sent out and the probe frequency. In one embodiment, the active measurement unit can probe a particular server multiple times per minute or once every few minutes. Note that monitoring the performance of a particular application can involve sending probe sequences not only to the application server but also to other servers on which the application depends. In the example shown in FIG. 2, to monitor the performance of the search application for the Missouri user, the active measurement unit can send probe sequences to both application server 208 and public DNS server 212. In some embodiments, the active measurement unit can send the probe sequences to the two servers in parallel such that the two servers are probed simultaneously. This way, the IT administrator can pinpoint the source of an instant failure of the search application.

The active measurement unit can receive and analyze the response packets to the probe sequences (operation 516). The response packets typically are sent by intermediate nodes along the path to the endpoint under probe. The active measurement unit can use information included in the response packets to determine various properties associated with the intermediate nodes and hops, such as delay, jitter, packet-loss rate, etc. The active measurement unit can then generate and display the network monitoring results on a user interface (operation 518). While generating the network monitoring results, the active measurement unit can also correlate the information included in the response packets with other application performance data (such as system logs and metrics of the endpoints) to provide the IT administrator with more accurate information about the performance of the application with respect to a particular user or group of users.

Figure 6:
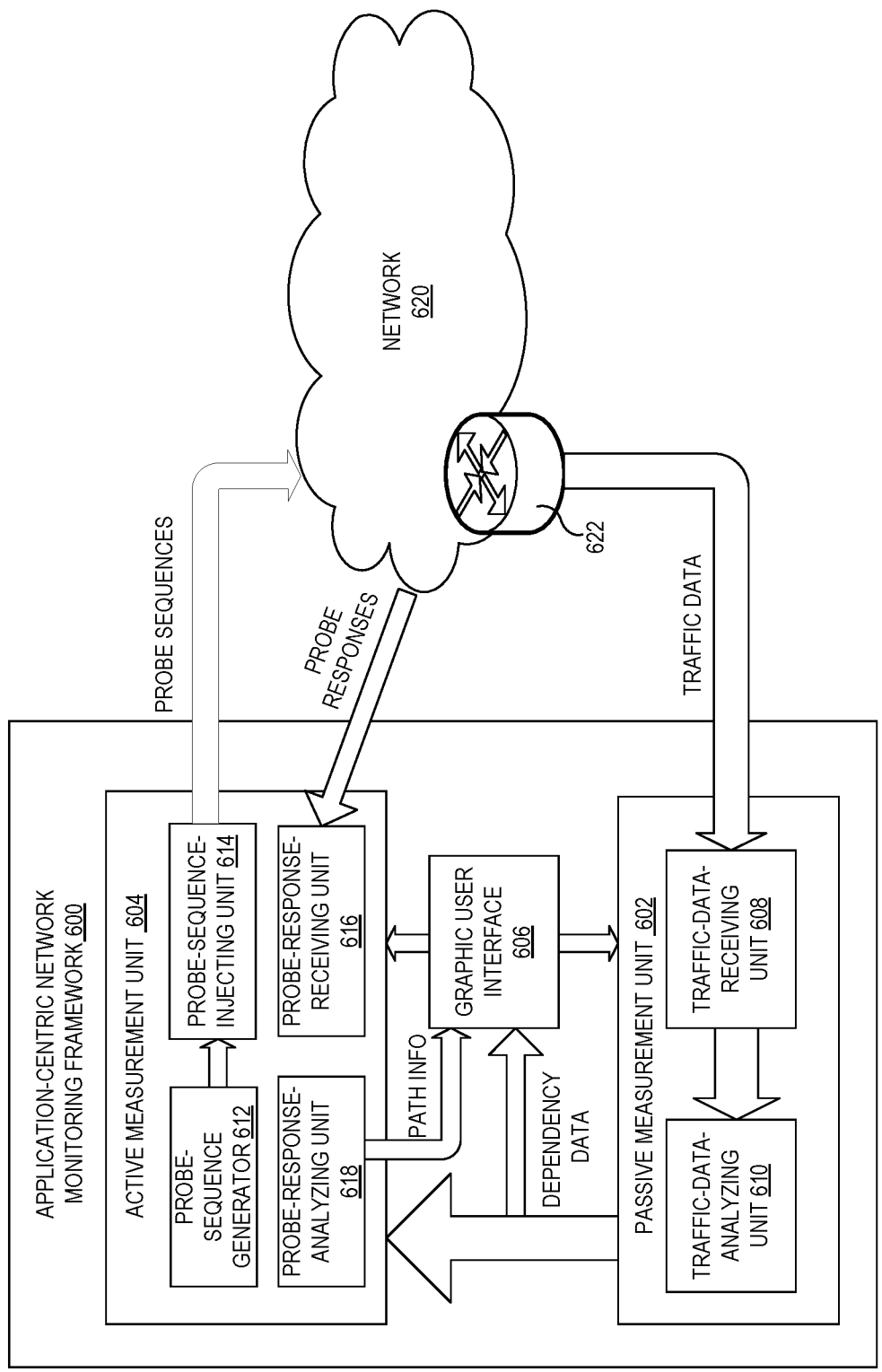
FIG. 6 illustrates the exemplary architecture of an application-centric network monitoring framework, according to one embodiment of the instant application.

FIG. 6 illustrates the exemplary architecture of an application-centric network monitoring framework, according to one embodiment of the instant application. Application-centric network monitoring framework 600 can include a passive measurement unit 602, an active measurement unit 604, and a graphic user interface (GUI) 606. Application-centric network monitoring framework 600 can be used to monitor the performance of a network 620.

Passive measurement unit 602 can be responsible for performing passive measurements on the network and can include a traffic-data-receiving unit 608 and a traffic-data-analyzing unit 610. Traffic-data-receiving unit 608 can communicate with a network device 622 to collect traffic data (e.g., to capture packets passing through network device 622). In one embodiment, network device 622 can be an edge router of network 620. In an alternative embodiment, network device 622 can be an end host within network 620.

Traffic-data-analyzing unit 610 can be responsible for analyzing the traffic data to discover dependencies of network services and/or functions. In some embodiments, traffic-data-analyzing unit 610 can implement a machine-learning technique (e.g., unsupervised learning) to cluster the traffic flows based on flow information included in packet headers, including but not limited to the source/destination addresses and port numbers, the protocols, the sequence numbers, the timestamps, etc. More particularly, traffic-data-analyzing unit 610 can perform Temporal Investigation to determine the temporal and frequency correlations among the traffic flows and to discover the causal dependencies among the network applications/services.

The outcome of the traffic analysis for an application can include dependency data that can specify endpoints involved in the application and their characteristics. Passive measurement unit 602 can then send the dependency data to active measurement unit 604 to facilitate active measurements of the endpoints. The dependency data can also be sent to GUI 606 for display.

Active measurement unit 604 can be responsible for performing active measurements on the network by simulating user behaviors to determine the performance of the network. In some embodiments, when monitoring the performance of a particular application, active measurement unit 604 can actively probe endpoints or servers involved in that application, including both the destination application server(s) of the user traffic as well as other servers (e.g., DNS servers, authentication servers, directory servers, etc.) facilitating the delivery of the application.

Active measurement unit 604 can include a probe-sequence generator 612 that can generate, for each probe destination, a number of probe sequences based on the dependency data obtained from passive measurement unit 602. In one embodiment, the dependency data can include the addresses and characteristics of the endpoints (e.g., servers) associated with a particular application. For each endpoint or server, probe-sequence generator 612 can generate multiple probe sequences, with each sequence comprising multiple packets and each packet using the address of the endpoint as the destination address. The probe packets can be generated based on the characteristics of the endpoint. If the endpoint implements TCP, probe-sequence generator 612 can generate TCP packets; if the endpoint implements UDP, probe-sequence generator 612 can generate UDP packets. Other protocols can also be possible. All packets within the same probe sequence should have a similar packet signature such that these packets can follow the same path. Packets in different probe sequences can have different signatures to enable the discovery of multiple paths between two endpoints. When there are a plurality of application servers providing the service to a group of users (e.g., users within the same subnet), probe-sequence generator 612 can generate the probe sequences for a predetermined number of top servers (or the most accessed servers).

Probe-sequence-injecting unit 614 can inject the probe sequences into network 620. In some embodiments, the probe sequences can be injected into network 620 through an end host. In alternative embodiments, the probe sequences can be injected into network 620 through a router. When multiple servers are involved in an application, probe-sequence-injecting unit 614 can inject corresponding probe sequences to the multiple servers in parallel. Probe-response-receiving unit 616 can be responsible for receiving the responses to the probe packets. Note that the probe packets in each sequence can have incrementing TTL values such that they can cause different intermediate nodes along the path to send response packets. Probe-response-analyzing unit 618 can be responsible for analyzing the probe responses to derive path information. The path information can include the addresses and characteristics of the intermediate nodes and the per-hop performance data (e.g., delay, jitter, packet-loss rate, etc.). The path information can also be sent to GUI 606 for display. An IT administrator can view the displayed path information to monitor the performance of the application (e.g., to identify current or potential problems in the network that may affect the delivery of the application).

Figure 7:
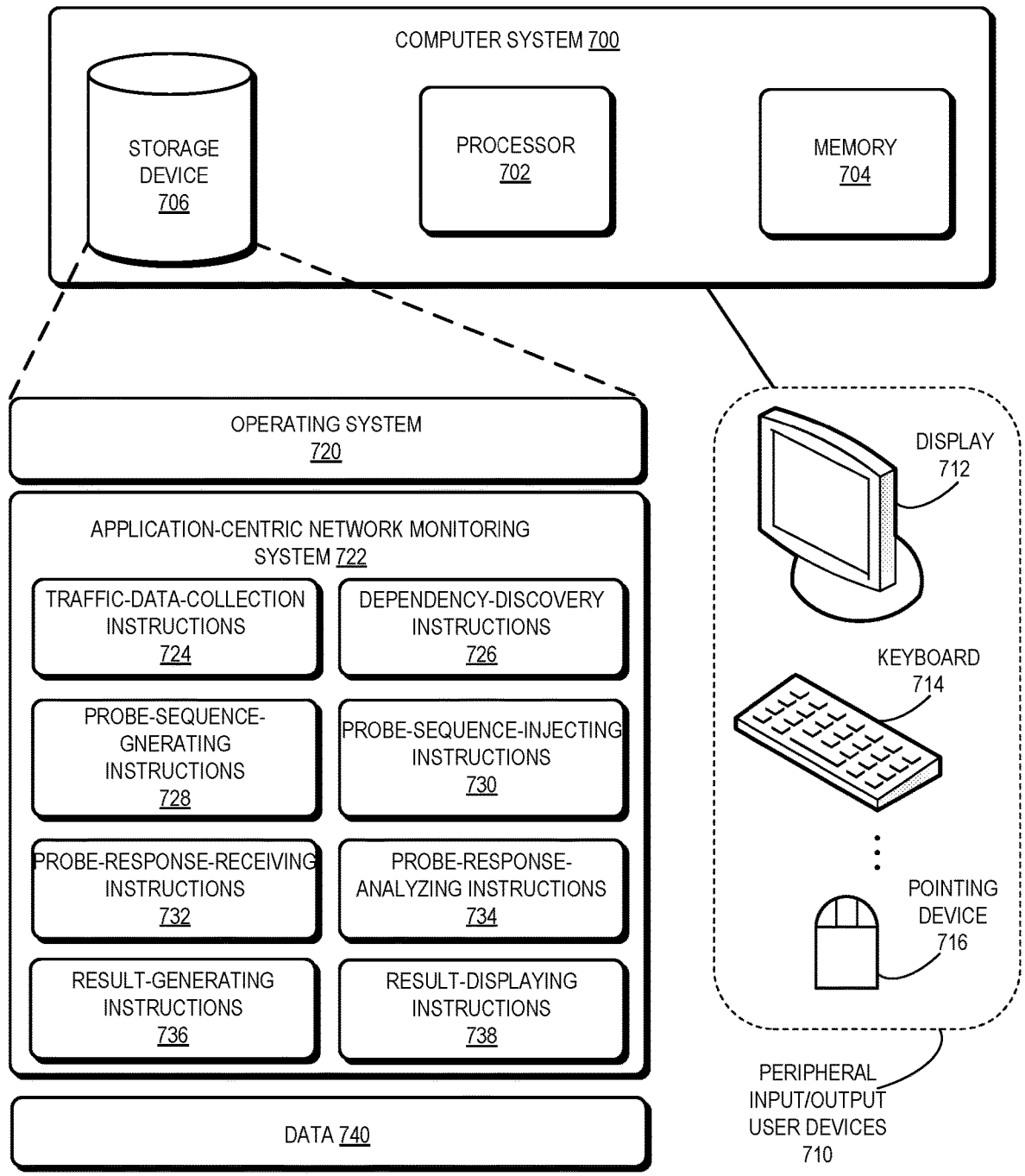
FIG. 7 illustrates an exemplary computer system that facilitates application-centric network monitoring, according to one embodiment of the instant application.

FIG. 7 illustrates an exemplary computer system that facilitates application-centric network monitoring, according to one embodiment of the instant application. Computer system 700 includes a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 720, an application-centric network monitoring system 722, and data 740.

Application-centric network monitoring system 722 can include instructions, which when executed by computer system 700, can cause computer system 700 or processor 702 to perform methods and/or processes described in this disclosure. Specifically, application-centric network monitoring 722 can include instructions for passively collecting traffic data from a network (traffic-data-collection instructions 724), instructions for discovering dependencies among network services based on the traffic data (dependency-discovery instructions 726), instructions for generating probe sequences based on the discovered dependencies (probe-sequence-generating instructions 728), instructions for injecting the probe sequences into the network (probe-sequence-injecting instructions 730), instructions for receiving response packets to the probe packets (probe-response-receiving instructions 732), instructions for analyzing the probe-response packets (probe-response-analyzing instructions 734), instructions for generating the monitoring result (result-generating instructions 736), and instructions for displaying the monitoring result (result-displaying instructions 738).

In general, embodiments of the present invention can provide a holistic network monitoring framework that can perform passive measurements to discover dependencies among the network servers and can use the dependency information to adaptively perform active measurements on the discovered servers, thereby facilitating the monitoring of the performance of portions of the network associated with a particular application. Performing the passive measurements can include collecting traffic data and applying a machine-learning technique to detect temporal and frequency correlations among traffic flows. Dependency data associated with one particular application can include addresses of destination servers and their characteristics. Performing the active measurements can include generating probe sequences simulating the behaviors of the users based on the dependency data, injecting the probe sequences into the network, and analyzing the response packets to extract path information. The framework can also include a user interface that displays the measurement results (including both the passive and active measurements). An IT administrator can also set some measurement parameters via the user interface.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, the method comprising:
   collecting, from a network device, traffic data associated with a network;
   applying a machine learning technique to analyze the traffic data to discover dependencies among a plurality of applications and services accessed by client devices within the network, wherein applying the machine learning technique comprises determining temporal and frequency correlations among packets associated with the plurality of applications and services, wherein determining the temporal correlation comprises determining whether packets destined for different applications and services are sent from a same client device within a predetermined interval, and wherein determining the frequency correlation comprises determining a number of client devices accessing each application or service;
   identifying, based on the discovered dependencies, a first server providing a first application and at least a second server providing a service that facilitates delivery of the first application; and
   performing active measurement on the first server and at least the second server, thereby facilitating monitoring of performance of the first application.

2. The computer-implemented method of claim 1, wherein collecting the traffic data comprises capturing packets belonging to different traffic flows passing through the network device; and
   wherein applying the machine learning technique comprises extracting flow information from headers of the captured packets and determining timing information associated with each flow.

3. The computer-implemented method of claim 1, wherein identifying the first and second servers comprises:
   for a respective application, determining a number of servers providing the respective application to client devices within the network; and
   identifying a most accessed server from the determined servers.

4. The computer-implemented method of claim 1, wherein performing the active measurement on a respective server comprises:
   generating a plurality of probe sequences based on an address of the respective server and a communication protocol implemented by the respective server;
   injecting the probe sequences into the network; and
   receiving and analyzing responses to the probe sequences to obtain information associated with intermediate nodes on one or more paths to the respective server.

5. The computer-implemented method of claim 4, wherein each probe sequence comprises a plurality of packets with incrementing time-to-live (TTL) values, and wherein packets within the probe sequence have a similar packet signature such that the packets follow a same path to the respective server.

6. The computer-implemented method of claim 1, further comprising one or more of:
   displaying the discovered dependencies on a user interface; and
   displaying results of the active measurement on the user interface.

7. A network monitoring system, comprising:
   a processor; and
   a storage device coupled to the processor and storing instructions that when executed by the processor cause the processor to perform a method, the method comprising:
   collecting, from a network device, traffic data associated with a network;
   applying a machine learning technique to analyze the traffic data to discover dependencies among a plurality of applications and services accessed by client devices within the network,
   wherein applying the machine learning technique comprises determining temporal and frequency correlations among packets associated with the plurality of applications and services, wherein determining the temporal correlation comprises determining whether packets destined for different applications and services are sent from a same client device within a predetermined interval, and wherein determining the frequency correlation comprises determining a number of client devices accessing each application or service;

identifying, based on the discovered dependencies, a first server providing a first application and at least a second server providing a service that facilitates delivery of the first application; and performing active measurement on the first server and at least the second server, thereby facilitating monitoring of performance of the first application.

8. The network monitoring system of claim 7,
wherein collecting the traffic data comprises capturing packets belonging to different traffic flows passing through the network device; and
wherein applying the machine learning technique comprises extracting flow information from headers of the captured packets and determine timing information associated with each flow.

9. The network monitoring system of claim 7, wherein identifying the first and second servers comprises:
for a respective application, determine a number of servers providing the respective application to client devices within the network; and
identify a most accessed server from the determined servers.

10. The network monitoring system of claim 7, wherein performing the active measurement on a respective server comprises:
generating a plurality of probe sequences based on an address of the respective server and a communication protocol implemented by the respective server;
injecting the probe sequences into the network; and
receiving and analyzing responses to the probe sequences to obtain information associated with intermediate nodes on one or more paths to the respective server.

11. The network monitoring system of claim 10, wherein each probe sequence comprises a plurality of packets with incrementing time-to-live (TTL) values, and wherein packets within the probe sequence have a similar packet signature such that the packets follow a same path to the respective server.

12. The network monitoring system of claim 7, further comprising a user interface to display one or more of:
the discovered dependencies; and
results of the active measurement.

13. A non-transitory computer-readable storage medium storing instructions that when executed by a processor cause the processor to perform a method, the method comprising:
collecting, from a network device, traffic data associated with a network;
applying a machine learning technique to analyze the traffic data to discover dependencies among a plurality of applications and services accessed by client devices within the network, wherein applying the machine learning technique comprises determining temporal and frequency correlations among packets associated with the plurality of applications and services, wherein determining the temporal correlation comprises determining whether packets destined for different applications and services are sent from a same client device within a predetermined interval, and wherein determining the frequency correlation comprises determining a number of client devices accessing each application or service;
identifying, based on the discovered dependencies, a first server providing a first application and at least a second server providing a service that facilitates delivery of the first application; and
performing active measurement on the first server and at least the second server, thereby facilitating monitoring of performance of the first application.

14. The non-transitory computer-readable storage medium of claim 13,
wherein collecting the traffic data comprises capturing packets belonging to different traffic flows passing through the network device; and
wherein applying the machine learning technique comprises extracting flow information from headers of the captured packets and determining timing information associated with each flow.

15. The non-transitory computer-readable storage medium of claim 13,
wherein identifying the first and second servers comprises:
for a respective application, determining a number of servers providing the respective application to client devices within the network; and
identifying a most accessed server from the determined servers.

16. The non-transitory computer-readable storage medium of claim 13, wherein performing the active measurement on a respective server comprises:
generating a plurality of probe sequences based on an address of the respective server and a communication protocol implemented by the respective server;
injecting the probe sequences into the network; and
receiving and analyzing responses to the probe sequences to obtain information associated with intermediate nodes on one or more paths to the respective server.

17. The non-transitory computer-readable storage medium of claim 16, wherein each probe sequence comprises a plurality of packets with incrementing time-to-live (TTL) values, and wherein packets within the probe sequence have a similar packet signature such that the packets follow a same path to the respective server.

* * * * *